(12) United States Patent  
Kim et al.

(10) Patent No.: US 9,746,668 B2  
(45) Date of Patent: Aug. 29, 2017

(54) HEAD-UP DISPLAY DEVICE AND VEHICLE HAVING THE SAME

(71) Applicant: LG ELECTRONICS INC., Seoul (KR)

(72) Inventors: Dongwook Kim, Seoul (KR); Kyoungil Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 30 days.

(21) Appl. No.: 14/690,688

(22) Filed: Apr. 20, 2015

(65) Prior Publication Data

US 2015/0316765 A1 Nov. 5, 2015

(30) Foreign Application Priority Data

Apr. 30, 2014 (KR) ........................ 10-2014-0052760

(51) Int. Cl.  
*G02B 27/01* (2006.01)  
*H04N 5/247* (2006.01)  
*H04N 5/232* (2006.01)

(52) U.S. Cl.  
CPC ..... *G02B 27/0101* (2013.01); *H04N 5/23293* (2013.01); *H04N 5/247* (2013.01); *G02B 2027/014* (2013.01); *G02B 2027/0123* (2013.01); *G02B 2027/0138* (2013.01); *G02B 2027/0141* (2013.01)

(58) Field of Classification Search  
CPC ........ G02B 27/0101; G02B 2027/0123; G02B 2027/014; G02B 2027/0138; G02B 2027/0141; H04N 5/247; H04N 5/23293  
See application file for complete search history.

(56) References Cited

U.S. PATENT DOCUMENTS

| 6,750,832 B1 | 6/2004 | Kleinschmidt |
| 7,126,583 B1 * | 10/2006 | Breed ..................... B60K 35/00 345/158 |
| 2003/0169213 A1 * | 9/2003 | Spero ....................... G02B 5/20 345/7 |

(Continued)

FOREIGN PATENT DOCUMENTS

| CN | 101147094 | 3/2008 |
| JP | 2005-153811 A | 6/2005 |

(Continued)

OTHER PUBLICATIONS

European Search Report dated Sep. 24, 2015 issued in Application No. 15001275.5.

(Continued)

*Primary Examiner* — Ibrahim Khan  
(74) *Attorney, Agent, or Firm* — KED & Associates LLP (57) ABSTRACT

A head-up display (HUD) device configured to project at least one of an image or a text on a windshield includes a display panel, a backlight module configured to emit light to the display panel, and an optical guide module configured to guide the at least one of the image or the text displayed on the display panel to the windshield. The backlight module includes a plurality of light sources configured to emit light to the display panel in different directions from one another such that the at least one of the image or text is independently projected on different regions of the windshield.

23 Claims, 8 Drawing Sheets

(56) References Cited

U.S. PATENT DOCUMENTS

| | | | | |
|---|---|---|---|---|
| 2005/0154505 A1* | 7/2005 | Nakamura | ........... | G01C 21/365 701/1 |
| 2006/0171007 A1 | 8/2006 | Chen et al. | | |
| 2009/0009314 A1* | 1/2009 | Taniguchi | ................. | B60R 1/00 340/461 |
| 2010/0157430 A1 | 6/2010 | Hotta et al. | | |
| 2010/0164702 A1* | 7/2010 | Sasaki | .................... | G01B 21/22 340/438 |
| 2010/0321170 A1* | 12/2010 | Cooper | ................. | G02B 27/01 340/425.5 |
| 2012/0154591 A1* | 6/2012 | Baur | ........................ | B60R 1/00 348/148 |
| 2012/0188651 A1 | 7/2012 | Lin | | |
| 2013/0128049 A1* | 5/2013 | Schofield | ............... | B60N 2/002 348/148 |
| 2013/0285804 A1* | 10/2013 | Huang | .................... | G08G 1/16 340/441 |
| 2014/0063359 A1* | 3/2014 | Chen | ................. | G02B 27/0101 349/11 |
| 2014/0267688 A1* | 9/2014 | Aich | ...................... | H04N 7/181 348/113 |
| 2014/0362195 A1* | 12/2014 | Ng-Thow-Hing | . | G06K 9/00791 348/51 |
| 2015/0061976 A1* | 3/2015 | Ferri | .................. | G02B 27/0101 345/9 |
| 2015/0108782 A1* | 4/2015 | Chou | ................. | G02B 27/0101 296/90 |

FOREIGN PATENT DOCUMENTS

| | | |
|---|---|---|
| JP | 2005-178624 A | 7/2005 |
| JP | 2012-179935 A | 9/2012 |
| KR | 10-1381727 B1 | 4/2014 |
| WO | WO 2006/102368 A2 | 9/2006 |

OTHER PUBLICATIONS

Korean Office Action dated Nov. 5, 2015 issued in Application No. 10-2014-0052760.

Chinese Office Action dated Feb. 6, 2017 issued in Application No. 201510210494.0 (with English Translation).

* cited by examiner

HEAD-UP DISPLAY DEVICE AND VEHICLE HAVING THE SAME

CROSS-REFERENCE TO RELATED APPLICATION

This application claims priority under 35 U.S.C. §119 to Korean Application No. 10-2014-0052760 filed on Apr. 30, 2014, whose entire disclosure is hereby incorporated by reference.

BACKGROUND

1. Field

This specification relates to a head-up display device configured to display a driving (traveling) information image.

2. Background

Various driving assistance systems and devices are developed for convenience and safety of a driver of a vehicle. As part of the development, a head-up display (HUD) device has recently been mounted in a vehicle. The head-up display device is a next generation display device, which enables more effective transfer of driving information to a driver while the driver drives a vehicle.

The HUD has actually been developed to reduce inconvenience of an aircraft pilot who has to check an external reference, keeping a look down at instruments within a cockpit. Typically, a reference ratio of about 8:2 is maintained between an outside condition and an internal instrument during an instrument flight. However, almost 99% external data or more has to be referred to during a formation flight. Therefore, various types of required information are projected to the pilot's visual field for reference.

The motivation of the HUD development may equally be applied to an HUD for vehicle. A navigation provides a driver (or a user) with important information required for driving a vehicle, and thus the user has to frequently check such information. However, a navigation screen is not located at the front of the driver, which causes the driver's inconvenience in checking it and is likely to cause an accident while driving the vehicle.

The HUD device mounted to the vehicle allows the driver to check information required for driving without dispersing the driver's eyes from the front side. For example, the HUD device displays on a windshield driving information, such as a driving velocity, a driving distance, the number of revolutions (RPM) of an engine, and the like, and vehicle information such as a quantity of fuel and the like. With displaying such driving-related information on the windshield while driving the vehicle, the driver does not have to turn his or her eyes to a dash board having an instrument board and the like. This may result in prevention of an accident which may be caused due to not looking forward.

In recent time, the development of automotive technologies allows drivers to be provided with more information while they are driving their vehicles. However, the conventional HUD device has a limitation in a quantity of information which can be simultaneously provided. To overcome such limitation, a panel within the HUD device has to increase in size, which results in an increase in weight as well as the size of the HUD device.

Since there are many electronic components within a vehicle, the increase in the size increase of the HUD device is limited. Hence, there is a requirement for developing an HUD device which can have a reduced size and provide information more efficiently.

BRIEF DESCRIPTION OF THE DRAWINGS

The embodiments will be described in detail with reference to the following drawings in which like reference numerals refer to like elements wherein.

DETAILED DESCRIPTION

Figure 1:
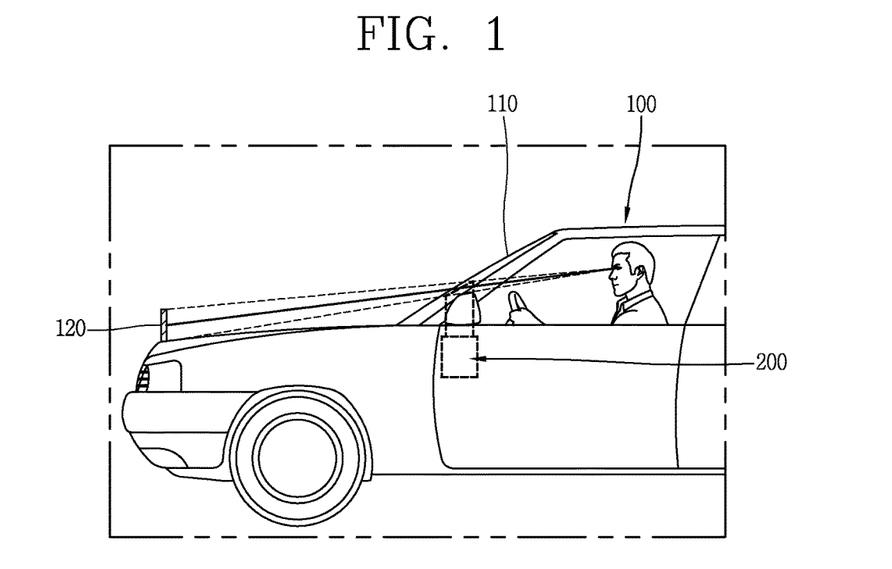
FIG. 1 is a conceptual view illustrating a principle of a head-up display (HUD) device.

FIG. 1 is a conceptual view illustrating a principle of a head-up display (HUD) device 200. A head-up display (HUD) device 200 according to one exemplary embodiment disclosed herein is mounted in a vehicle 100 and displays driving-related information on a windshield 110. To this end, the HUD device 200 includes a communication unit, a controller, a display unit and the like.

An external server is connected to vehicles through networks. Examples of the networks include various types of wireless communication networks, such as wireless Internet networks, such as Wide Area Network (WAN), Wireless Broadband Internet (WiBro) and the like, and mobile telecommunication networks, such as Code Division Multiple Access (CDMA), Global System for Mobile telecommunication (GSM) and the like.

The external server collects and stores driving information relating to vehicles by communicating with the vehicles through such networks. When a specific vehicle 100 requests for driving information related to other vehicles 100, the external server provides the specific vehicle 100 with the driving information related to vehicles adjacent to the specific vehicle 100.

The driving information includes various types of driving-related information of each vehicle 100, such as a destination, an estimated driving path toward a destination, a current position, current velocity, a velocity variation, a driving direction, changes in a driving direction and the like.

The server periodically receives and updates such information from the vehicles. Specifically, when there is a driving information request from a terminal mounted in a specific vehicle 100, the server transmits the collected information to the terminal mounted in the specific vehicle 100 through an Internet or a communication network, such as a CDMA or GSM.

The terminal includes a terminal which is cooperative with a global positioning system (GPS) module installed in the vehicle 100 for receiving navigation messages sent from a GPS satellite and outputs graphic information on a display provided thereto, and various types of portable terminals. The communication module of the HUD device 200 may perform data transmission and reception by being connected to the server or with a portable terminal connected to the server.

The controller transmits a current position of the vehicle 100 to the server, and receives driving information, such as traffic conditions of adjacent areas, from the server. The controller analyzes the driving information and outputs the analysis result through the display unit.

The controller analyzes GPS information, driving information and the like, and transmits such information to the server through the communication module. The GPS information includes information related to a current position, a start point, a destination and the like of the vehicle 100. The driving information includes information related to velocity, a velocity variation, a lane change of the vehicle 100.

The controller is connected to various sensors and structures of the vehicle 100 for collecting such information. The sensors include a proximity sensor, a velocity sensor, a temperature sensor, a pressure sensor, an accelerometer, and the like. The structures of the vehicle 100 include a handle, turn signals 130 (see FIG. 5), a brake, a black box and the like.

Front, rear and side cameras may be mounted to the vehicle 100. The controller 180 analyzes and stores image information collected by the cameras. The controller may output the image information received from the cameras on the windshield 110 or switch the image information into text information so as to output on the windshield 110.

The controller processes image information related to left rear and right rear sides of the vehicle 100, received from those cameras, and outputs the processed image information on the windshield 110. When there is no change in a driving state, the driving information may not be output on the windshield 110. For example, when the vehicle 100 is driven on the same lane at the same velocity, the driving information may not be output.

For the sake of explanation, it has been described that the images are output on the windshield 110. However, the windshield 110 serves to reflect light projected by the HUD device 200. A driver receives light reflected by the windshield 110 and recognizes that an image 120 is present in a viewing direction.

Figure 2:
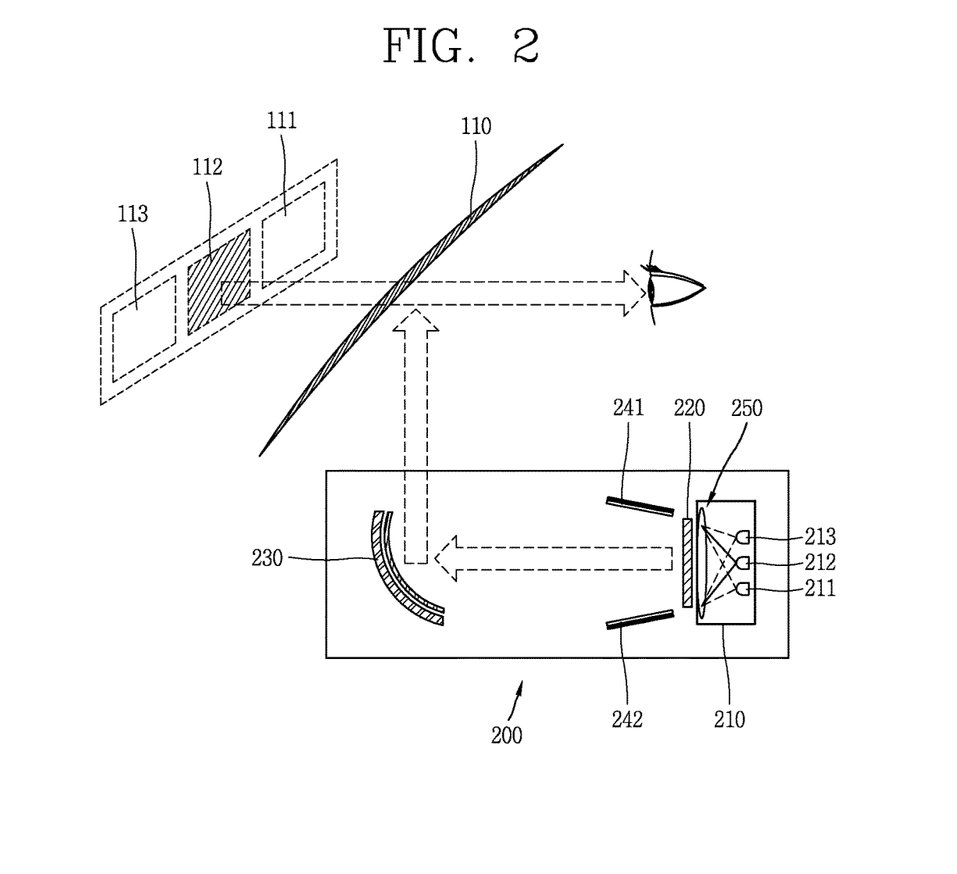
FIG. 2 is a conceptual view illustrating a structure of an HUD device in accordance with one exemplary embodiment of the present disclosure.

FIG. 2 is a view illustrating a structure of an HUD device 200 in accordance with one exemplary embodiment of the present disclosure. The HUD device 200 includes a display panel 220, a backlight module or a light source 210 and an optical guide module.

The display panel 220 outputs driving information images. The display panel 220 outputs driving information by virtue of light, as a light source, emitted from the backlight module 210. The display panel 220 may be configured by bonding a transistor substrate and a color filter substrate with liquid crystals interposed therebetween, and represent a different color of light for each pixel by adjusting transmittance of light using the liquid crystals.

The backlight module 210 is disposed behind the display panel 220 to emit light toward the display panel 220. The backlight module 210 disclosed herein includes a plurality of backlight units which emit light to the display panel 220 in different directions from one another and may comprise a plurality of light emitting devices (LEDs).

This exemplary embodiment illustrates that the backlight module 210 includes first to third backlight units 211, 212 and 213 arranged along one direction with being spaced apart from one another. The second backlight unit 212 is disposed to overlap a center of the display panel 220, and the first backlight unit 211 and the third backlight unit 213 are spaced apart from each other in opposite directions with the second backlight unit 212 therebetween.

The first to third backlight units 211, 212 and 213 operate independently. For example, it may be possible to operate one or all of the first to third backlight units 211, 212 and 213. In addition, the first to third backlight units 211, 212 and 213 may operate in an alternating manner. Here, a short alternating interval may be set such that all of three images seem to be displayed on the windshield 110.

The first to third backlight units 211, 212 and 213 are configured to emit light to the display panel 220 in different directions from one another. As illustrated in FIG. 2, an optical axis of the second backlight unit 212 is perpendicular to the display panel 220, and the optical axes of the first and third backlight units 211 and 213 are inclined from the display panel 220. The first backlight unit 211 and the third backlight unit 213 are spaced apart from each other in the different directions based on the second backlight unit 212. Hence, light emitted from the first backlight unit 211 and light emitted from the third backlight unit 213 are inclinedly incident onto the display panel 220 in different directions. Alternatively or additionally, each backlight unit may be moveable and/or rotatable to change the angle of incidence.

The first to third backlight units 211, 212 and 213 may generate different images on the display panel 220, respectively. For example, the second backlight unit 212 may generate navigation information on the display panel 220 and the first and third backlight units 211 and 213 may generate information received from a mobile terminal on the display panel 220.

This embodiment has illustrated that the backlight module 210 includes the first to third backlight units 211, 212 and 213 for the sake of explanation, but the present disclosure may not be limited to the number of backlight units. If a backlight unit is provided in plural, the teaching of the present disclosure will be applied irrespective of the number.

The optical guide module guides light transmitted through the display panel 220 toward the windshield 110. The optical guide module may include a plurality of mirrors and lenses. This embodiment exemplarily illustrates that the optical guide module includes a main mirror 230 which reflects an image displayed on the display panel 220 to the windshield 110, and sub mirrors which are inclinedly disposed from a central axis of the display panel 220.

The sub mirrors may include a first sub mirror 241 which reflects light emitted from the first backlight unit 211 toward the main mirror 230, and a second sub mirror 242 which reflects light emitted from the third backlight unit 213 toward the main mirror 230. In other words, the first sub mirror 241 is located on an optical path of the light emitted from the first backlight unit 211 so as to reflect an image, which is output on the display panel 220 by the first backlight unit 211, toward the main mirror 230. Similarly, the second sub mirror 241 is located on an optical path of the light emitted from the third backlight unit 213 so as to reflect an image, which is output on the display panel 220 by the third backlight unit 213, toward the main mirror 230.

According to the teachings of the present disclosure, the first backlight unit 211 generates a first image on a first region 111 of the windshield 110, the second backlight unit 212 generates a second image on a second region 112 of the windshield 110, and the third backlight unit 213 generates a third image on a third region 113 of the windshield 110.

The first and second sub mirrors 241 and 242 may allow all of the first to third images generated by the first to third backlight units 211, 212 and 213 to be displayed on the second region 112 of the windshield 110. To this end, the first and second sub mirrors 241 and 242 may be configured to be tiltable. The controller of the HUD device 200 may control tilt angles of the first and second sub mirrors 241 and 242 according to a control signal.

With the adjustment of the tilt angles of the first and second mirrors 241 and 242, the first and third images generated by the first and third backlight units 211 and 213 may all be displayed on the second region 112 of the windshield 110. In addition, as illustrated previously, the second image generated by the second backlight unit 212 may also be displayed on the second region 112 of the windshield 110.

One exemplary embodiment of a control method using this structure will be explained in detail later with reference to FIG. 10. Between the display panel 220 and the backlight module 210 may be disposed a lens array 250 which gathers (collects) light emitted from the backlight units toward the display panel 220. The lens array 250 serves to enlarge or reduce images, which are incident from different directions, into appropriate sizes, and adjust a focal point.

Meanwhile, a plurality of reflection mirrors may be provided between the display panel 220 and the main mirror 230 to extend an advancing path of light. If a depth of field of a driving information image displayed on the windshield 110 is shallow, the other portions except for a specific portion may be outfocused (or blurred). Here, the reflection mirrors may be used to bypass the advancing path of the light so as to increase the depth of field of the driving information image. Accordingly, the image with sharp details and improved visibility can be obtained.

Figure 3A:
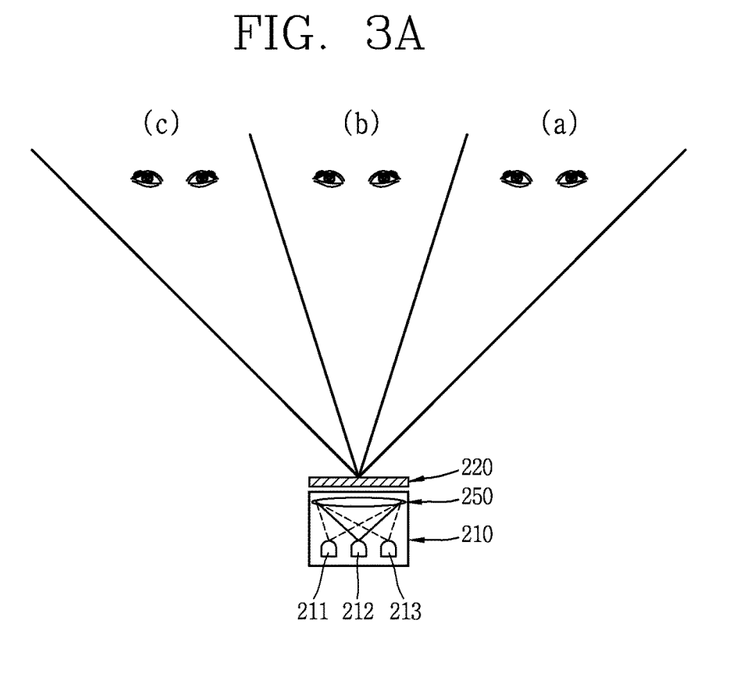
FIGS. 3A and 3B are conceptual views illustrating a principle of the HUD device illustrated in FIG. 2.
Figure 3B:
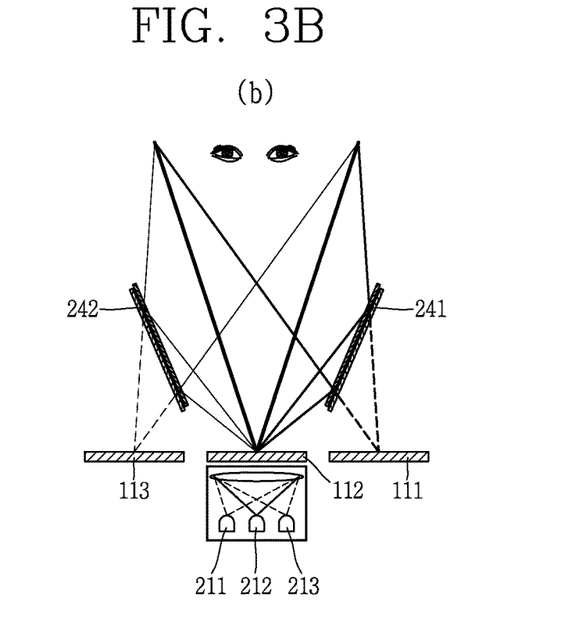

FIGS. 3A and 3B are views illustrating a principle of the HUD device illustrated in FIG. 2. In more detail, FIG. 3A illustrates a state when sub mirrors are not provided, and FIG. 3B illustrates a state where the sub mirrors are provided. As illustrated in FIG. 3A, the lens array 250 and the backlight module 210 are disposed behind the display panel 220. The backlight module 210 includes the plurality of backlight units 211, 212 and 213 which are spaced apart from one another and independently operate.

The first backlight unit 211 is disposed at one side and the third backlight unit 213 is disposed at the other side based on the second backlight unit 212. Light emitted from the first backlight unit 211 is ongoing toward the other side through the display panel 220 and light emitted from the third backlight unit 213 is ongoing toward the one side through the display panel 220. Meanwhile, light emitted from the second backlight unit 212 goes along by being perpendicularly transmitted through the display panel 220. Therefore, the clearest image can be viewed at a position (a) when the first backlight unit 211 operates, and at a position (b) when the second backlight unit 212 operates, and at a position (c) when the third backlight unit 213 operates.

As illustrated in FIG. 3B, sub mirrors are arranged at the front of the display panel 220. The sub mirrors are inclined from a central axis of the display panel 220 so as to reflect light, which is ongoing with being inclined to one side, toward the user located at the position (b). Accordingly, the user located at the position (b) may view an image as follows.

First, the second backlight unit 212 is located at a center of the display panel 220. Hence, the user recognizes that the second image generated by the second backlight unit 212 is displayed on the second region 112 in a forward direction. Meanwhile, the first sub mirror 241 is located on an optical path of the light emitted from the first backlight unit 211. The user senses light reflected by the first sub mirror 241. Therefore, the user recognizes that the first image generated by the first backlight unit 211 is displayed on the first region 111, which is located at a rear side of the first sub mirror 241 based on the user's vision viewing the first sub mirror 241.

Similar to this, the second sub mirror 242 is located on an optical path of the light emitted from the third backlight unit 213. Since the user senses light reflected by the second sub mirror 242, the user recognizes that the third image generated by the third backlight unit 213 is displayed on the third region 113, which is located at a rear side of the second sub mirror 242 based on the user's vision viewing the second sub mirror 242.

At the position (b), the user feels or perceives that the second image is displayed in the forward direction when the second backlight unit 212 operates, that the first mage is displayed at one side of the second image when the first backlight unit 211 operates, and that the third image is displayed at the other side of the second image when the third backlight unit 213 operates. Therefore, the user may view the displayed image at the position (b) without having to move, and view a different image according to a backlight unit in an operating state.

To implement this, the controller may change image information displayed on the display panel 220 to correspond to the operation of each of the plurality of backlight units. For example, the controller may control the display panel 220 to output first image information thereon when the first backlight unit 211 operates, and to output second image information thereon when the second backlight unit 212 operates. The plurality of images can be viewed independently or simultaneously by the user.

In order to allow the user to view the plurality of images in the independent manner, when one of the plurality of backlight units operates, the other backlight units may not operate. Here, image information corresponding to the backlight unit which operates may be output on the display panel 220.

In order for the user to view a plurality of images, the controller may control the display panel 220 to change image information to correspond to the operation of each of the plurality of backlight units. The controller may sequentially operate each of the plurality of backlight units with predetermined time intervals. Accordingly, one backlight unit repeats output and non-output, and a non-output time is generated between the output and the non-output. In order for the user to recognize an image without discontinuity, the non-output time is set within a preset time.

When the number of display regions output on the windshield 110 increases, the controller may reduce an operating time of each of the plurality of backlight units. For example, in an activated state of all of the first to third backlight units 211, 212 and 213, the controller may sequentially operate the first to third backlight units 211, 212 and 213 with a preset time interval. The preset time interval may be set to be inversely proportional to the number of backlight units in the activated state.

Meanwhile, each of images output respectively on the plurality of display regions may be image information belonging to a different category. The image information belonging to the different category may be related to information received from a different source. For example, driving information, camera information, navigation information, communication information (call, text, etc.) and the like may be output on different regions. To this end, the controller may control the image information output on the display panel 220 based on information received from different sources, and control an operation of each backlight unit based on the image information.

Figure 4:
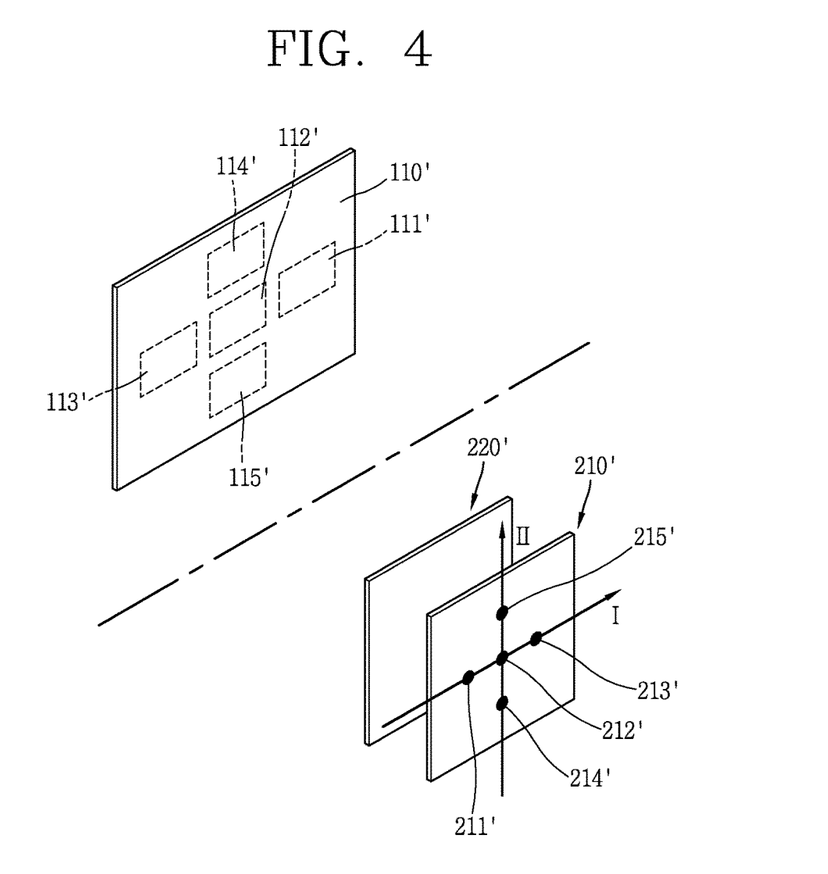
FIG. 4 is a conceptual view illustrating a backlight module in accordance with another exemplary embodiment of the present disclosure.

FIG. 4 is a view illustrating a backlight module in accordance with another exemplary embodiment of the present disclosure. A backlight unit 210' includes first to third backlight units 211', 212' and 213' arranged along a first direction I, and fourth and fifth backlight units 214' and 215' arranged along a second direction II intersecting with the first direction I. Although not illustrated, sub mirrors may be provided in all directions at the front of the display panel 220'. Each of the sub mirrors is provided on an optical path of light emitted from each of the first, third, fourth and fifth backlight units 211', 213', 214' and 215' so as to reflect an image displayed on the display panel 220' by the corresponding backlight unit toward a main mirror (not illustrated).

The method of outputting images by use of the first to fifth backlight units 211', 212', 213', 214' and 215' is the same as illustrated in FIGS. 2 to 3B. According to this exemplary embodiment, images displayed may extend even in a vertical direction, which may allow for efficiently providing more information to the user. As illustrated in FIG. 4, the first and third regions 111', 112' and 113' are located in a horizontal direction, and fourth and fifth regions 114' and 115' are located in the vertical direction.

FIGS. 5 to 11 are views illustrating exemplary embodiments of an image displayed on the HUD device 200 while the vehicle 100 is driven. Hereinafter, images displayed on the windshield 110 will be described in detail with reference to FIGS. 5 to 11.

Images displayed in the following embodiments are output by the aforementioned HUD device 200. For example, a first image may be projected by the first backlight unit 211, a second image may be projected by the second backlight unit 212, and a third image may be projected by the third backlight unit 213. The principle that the image is projected on the windshield 110 has been previously described in detail. Therefore, the following description will be given, focusing on an image displayed.

Figure 5:
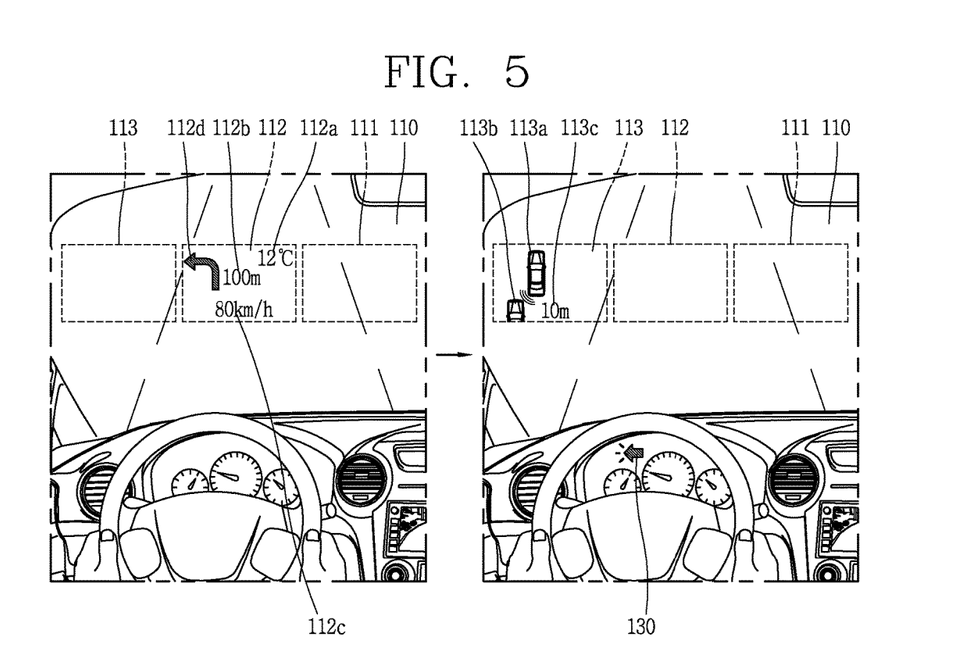
FIGS. 5 to 11 are conceptual views illustrating exemplary embodiments of an image displayed on an HUD device while a vehicle is driven.

FIG. 5 illustrates an embodiment in which an image changes in response to a turn-on of a turn signal 130. Three adjacent display regions are present on the windshield 110. A second region 112 for displaying the second image is present at a center. A first region 111 for displaying the first image is present at a right side of the second region 112, and a third region 113 for displaying the third image is present at a left side of the second region 112.

A state prior to a generation of an event is illustrated in the left drawing of FIG. 5. As illustrated, a driving state is displayed only on the second region 112 without displaying any image on the first and third regions 111 and 113. Navigation-related information may be displayed on the second region 112. For example, a current driving velocity 112c, a path guide image 112d, a distance 112b until the next guidance (notification, notice, etc.) and the like, all associated with the vehicle 100, may be displayed on the second region 112. Also, a current temperature 112a, current atmospheric pressure and the like may also be displayed on the second region 112. A combination or arrangement of those information displayed may be changeable by the user. The displayed information may be in the form of text or image.

A state upon a generation of a specific event is illustrated in the right drawing of FIG. 5. This embodiment assumes an event that the vehicle 100 approaches from a left rear side. Regions viewed through rearview mirrors also include blind spots, and thus it may be likely to occur an accident upon changing a lane. Accordingly to this embodiment, however, such accident can be prevented in advance.

The controller of the HUD device 200 according to this embodiment controls an image based on various types of information which are transmitted from sensors and turn signals 130 (see FIG. 5). When the driver switches on the turn signal 130, it is necessary to check whether or not another vehicle is present in a direction indicated by the turn signal 130. Here, the controller analyzes information sensed by a sensor mounted at the rear or side surface of the vehicle 100, and displays approach or non-approach of another vehicle on the windshield 110.

The displayed information may be in the form of text or image. For example, when the approach of another vehicle is sensed, the HUD device 200 may display a warning text or a vehicle image notifying "there is another vehicle in a direction to turn" on the windshield 110 to call the user's attention. In this embodiment, when the approach of the another vehicle is sensed, an image 113a of the currently-driving vehicle, an image 113b of the another vehicle and an image including distance information 113c between the two vehicles may be displayed on the windshield 110.

For helping more intuitive sensing, a display region may be changeable according to circumstances. For example, when desiring to change a current lane to a left lane, if a vehicle 100 located at a left rear side is sensed, event generation information is displayed on the third region 113. Similarly, when desiring to change a current lane to a right lane, if a vehicle 100 located at a right rear side is sensed, the event generation information is displayed on the first region 111.

To implement this, the controller may control a backlight unit, which outputs an image in a direction corresponding to a turn signal, of the plurality of backlight units, in response to an operation of the turn signal. Along with this, the controller may control image information output on the display panel 220 based on data sensed by a detection sensor. The detection sensor is provided at at least one side of the vehicle to detect an object (vehicle, person, etc.) surrounding the detection sensor.

An image of each region may be independently displayed in this embodiment. For example, event generation information may be displayed on the third region 113, and navigation information may be displayed on the second region 112, independent of the event generation information. As aforementioned, the image on each region may be projected by a different backlight unit.

FIG. 5 exemplarily illustrates that when the approach of the another vehicle is sensed, the second backlight unit 212 in the operating state is paused, the navigation information output on the second region 112 disappears, and then the third backlight unit 213 operates so as to output the event generation information notifying the approach of the another vehicle on the third region 113.

Figure 6:
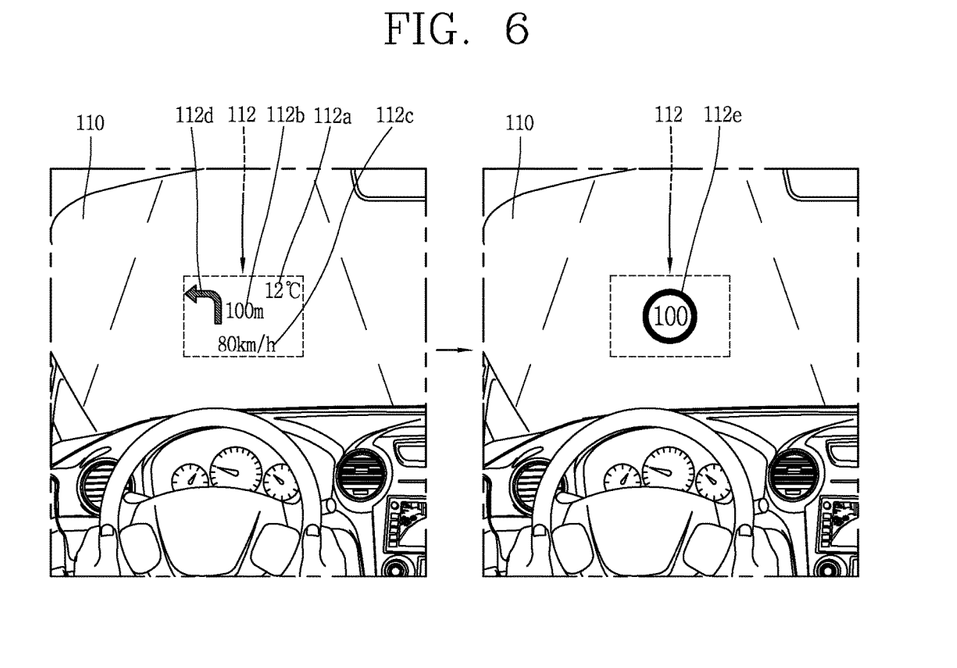

FIG. 6 illustrates an image when a velocity limit signal or an emergency condition signal is received through the communication unit. When the velocity limit signal or the emergency condition signal is received (hereinafter, referred to as "event generation"), a driving information image which is being output is switched into a warning image or text.

An image prior to the event generation is illustrated in the left drawing of FIG. 6. As illustrated, a driving state is output merely on the second region 112. Navigation-related information may be displayed on the second region 112. For example, a current driving velocity 112c, a path guide image 112d, a distance 112b until the next guidance (notification, notice, etc.) and the like, all associated with the vehicle, may be displayed on the second region 112. Also, a current temperature 112a, current atmospheric pressure and the like may also be displayed on the second region 112. A combination or arrangement of those information displayed may be changeable by the user.

An image after an event generation is illustrated in the right drawing of FIG. 6. In this embodiment, the event may refer to a case of receiving a velocity limit signal through the communication unit due to an entry into a velocity limit zone or being close to an overspeed control camera.

Upon such event generation, the driving information image which is being output is switched into a warning. The warning may be output as the driving information image fades in or out, or output as the driving information image is flickered. The warning may be displayed brighter than the driving information image. To this end, the controller adjusts an output of the second backlight unit 212. In other words, when an event is generated, the controller outputs a warning image by controlling the second backlight unit 212. Here, brightness of the image increases by increasing power supplied.

Figure 7:
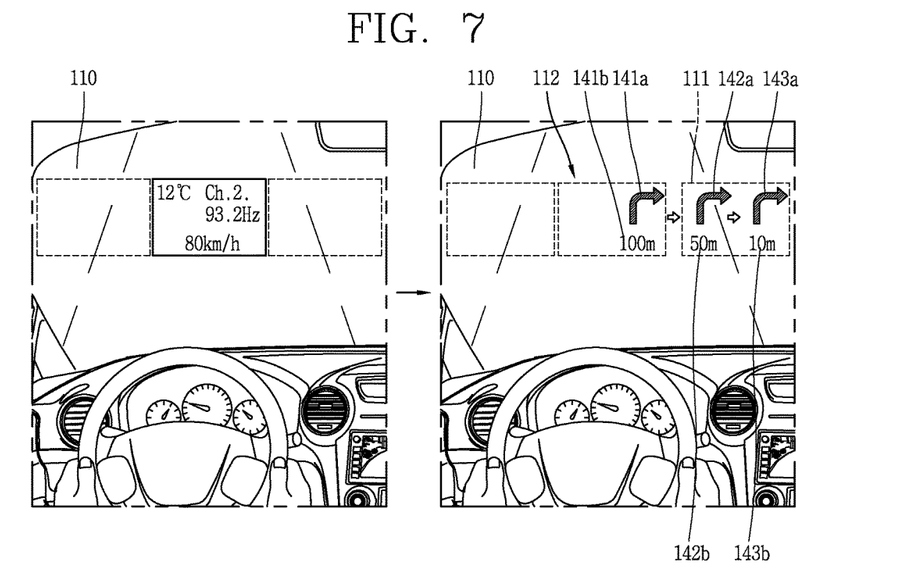

FIG. 7 illustrates a driving path guide image in accordance with one embodiment disclosed herein. When the vehicle 100 approaches a guide point, a guide image 141a is output on the second region 112. A distance 141b from the guide point is output below or above the image 141a.

When the vehicle 100 moves closer to the guide point, an image 142a and a distance 142b, which are associated with the image 141a and the distance 141b, respectively, are output on a region adjacent to the second region 112, namely, on the first region 111. The previously-output image 141a and distance 141b may disappear when the recently-output image 142a and distance 141b are output.

When the vehicle 100 moves much closer to the guide point, an image 143a and a distance 143b, which are associated with the image 142a and the distance 142b, respectively, are output on another positions within the adjacent region. Accordingly, the driver can recognize that the vehicle gets closer to the guide point. The previously-output image 142a and distance 142b may also disappear when the recently-output image 143a and distance 143b are output.

FIG. 7 exemplarily illustrates an output of a right-turn guide image.

According to the aforementioned control method, as the vehicles is closer to the guide point, the right-turn guide image is moved to right, such that the driver can more intuitively recognize that it is near the time to make a right turn. A control method similar to this is applied to a left-turn guide image. That is, the left-turn guide image seems to move to left as the guide point gets closer.

Figure 8:
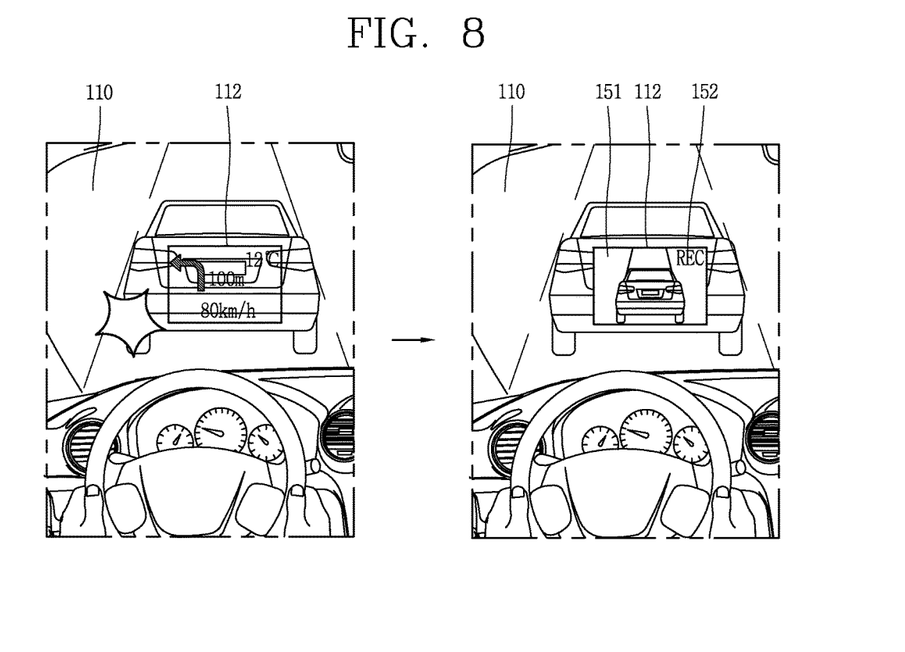

FIG. 8 illustrates an image when an impact is imminent to the vehicle 100. When an impact is imminent to a front side of the vehicle 100, a front camera is activated to record such condition, and a graphic object 152 indicating (or notifying) the ongoing recording is output on the windshield 110. The controller may display a recorded image 151 on the windshield 110. Similarly, when an impact is imminent to a rear side of the vehicle 100, a rear camera is activated to record such condition, and the graphic object 152 indicating the ongoing recording is output on the windshield 110. Here, the controller may display the recorded image 151 on the windshield 110.

Figure 9:
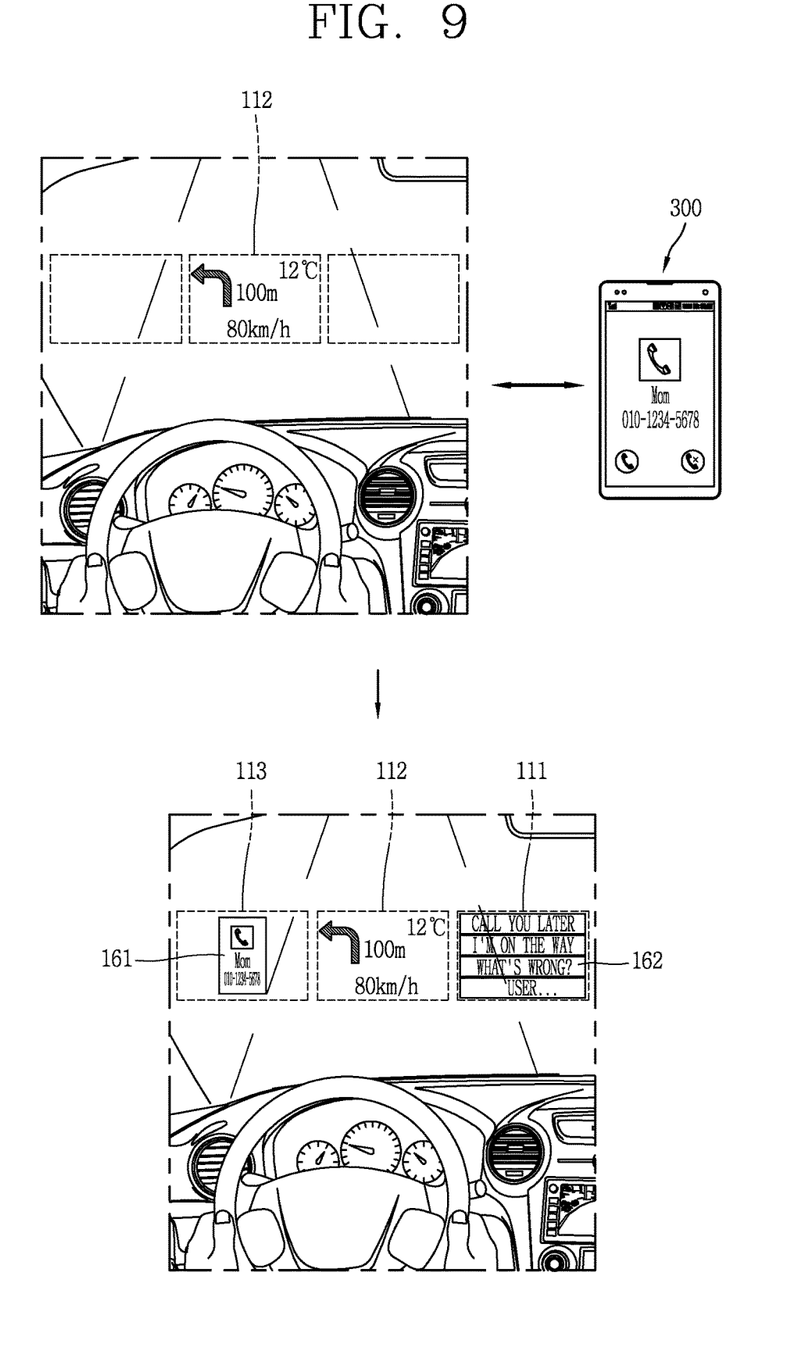

FIG. 9 illustrates an image upon using a mobile terminal during driving of the vehicle 100. The communication unit of the HUD device 200 performs data transmission and reception with an external device. Here, the external device includes a communication server, a mobile terminal 300 and the like. When an incoming call or a text message is received in the mobile terminal 300 during driving, the controller outputs an image, which is displayed on a display of the mobile terminal 300, on the windshield 110.

As illustrated in FIG. 9, a driving information image may be displayed on the second region 112, and incoming call information 161 may be displayed on the third region 113. The user may input a control command through a voice recognition unit or a manipulation unit. A selectable sub menu item 162 may be output on the first region 111 of the windshield 110.

When the user inputs a voice signal corresponding to the sub menu item 162, the controller transfers an associated command to the mobile terminal 300. Similarly, the user may select the sub menu item 162 using the manipulation unit. When the sub menu item 162 is selected, the controller transfers the associated command to the mobile terminal 300.

Figure 10:
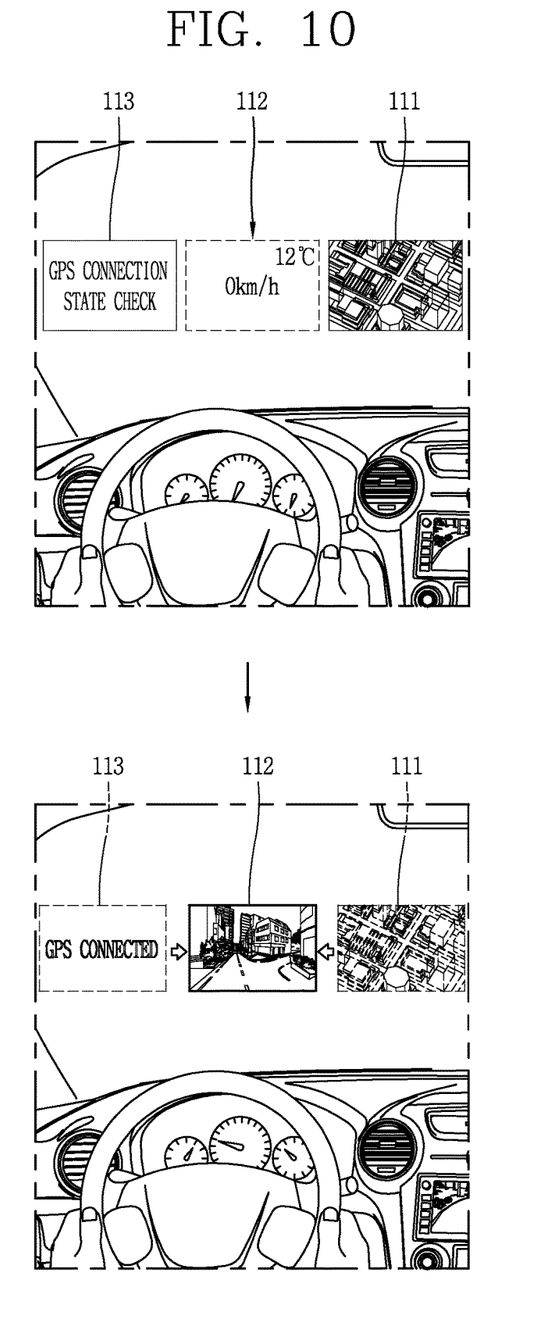

FIG. 10 illustrates an image when the vehicle 100 starts to be driven or the HUD device 200 is turned on. State information related to the vehicle 100, traffic information and the like may be selectively displayed on the second region 112. A map showing surroundings of a current position may be displayed on the first region 111 and a graphic object or a notification message may be displayed on the third region 113.

For example, when the vehicle which has been parked at an underground parking lot is driven to the outside, a graphic object indicating a communication connection state is output on the third region 113, and parking lot-related information is output on the first region 111. When the vehicle 100 driven out of the underground parking lot is in a GPS-connected state, the first region 111 and the third region 113 are moved toward the second region 112. The second region 112 may be maintained in a state of displaying the driving information. The controller may increase brightness of the second region 112 so as to provide a feeling like three regions of a screen are combined into one.

When the vehicle 100 is driven from the outside into the underground, an image displayed may operate in the reverse order. For example, the driving information output on the second region 112 is divided into the first and third regions 111 and 113 and parking information related to each floor or parking-available place is displayed.

Figure 11:
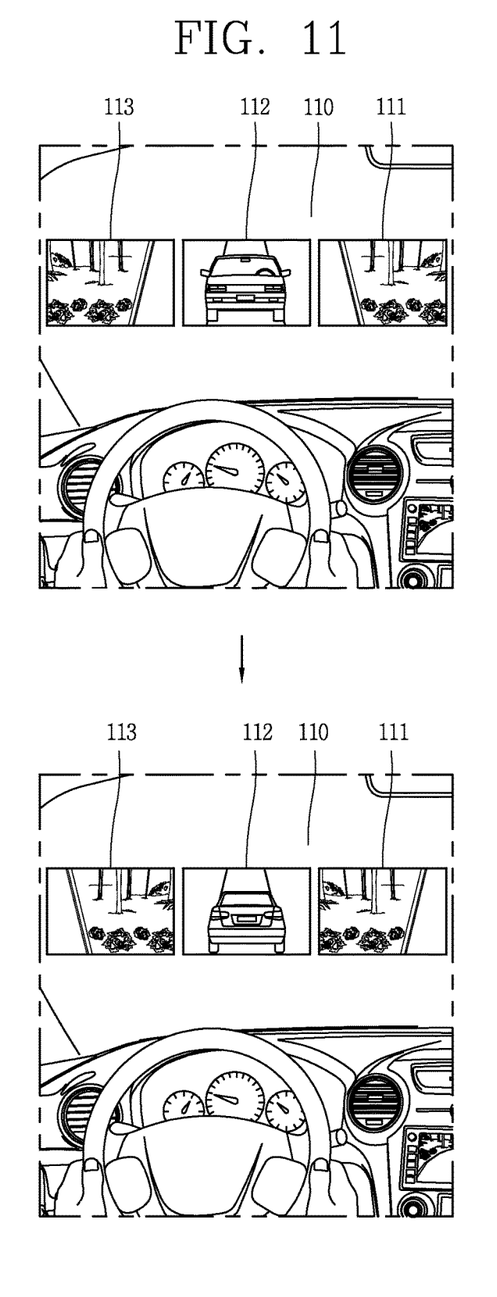

FIG. 11 illustrates an image which is displayed in response to a manipulation of a gearbox. A top drawing of FIG. 11 illustrates that a vehicle gear is placed at a forward movement direction, and a bottom drawing of FIG. 11 illustrates that the vehicle gear is placed at a backward movement position. According to this embodiment, image information projected on the windshield 110 may change based on a manipulation of a gear of the vehicle 100.

For example, as illustrated in the top drawing, when the vehicle gear is placed at the forward movement position, a right-side image of the vehicle may be output on the first region 111 which is located at the right side based on the second region 112, and a left-side image of the vehicle may be output on the third region 113 which is located at the left side based on the second region 112. Meanwhile, a rear-side image of the vehicle may be output on the second region 112. Accordingly, the user may acquire related information or image, even without viewing rearview mirrors for viewing left and right sides of the vehicle and a room mirror for viewing the rear side of the vehicle.

The image output may depend on a velocity of the vehicle. In other words, when the velocity of the vehicle is less than a predetermined velocity, camera images may be displayed. When the velocity of the vehicle becomes faster than the predetermined velocity, the camera images may be switched into driving information.

As illustrated in the bottom drawing, when the vehicle gear is placed at the backward movement position, the left-side image may be output on the first region 111, the rear-side image of the vehicle on the second image 112, and the right-side image of the vehicle on the third image 113. In such a manner, the image information output on the second image 112 may change based on the gear manipulation of the vehicle 100. Here, the image of the first region 111 and the image of the third region 113 may output the same image information, irrespective of the gear manipulation of the vehicle 100.

The HUD device according to at least one embodiment having such configuration may be configured such that the backlight units which operate independent of one another can emit light to the display panel 220 in the different directions. This may allow more information to be provided through the display panel 220 with the same size. According to the embodiment disclosed herein, more information can be provided on the windshield, without the necessity of increasing the size of the HUD device. Therefore, a limited inner space of the vehicle can be utilized more efficiently.

The configurations and methods of the head-up display (HUD) device and the vehicle having the same in the aforesaid embodiments may not be limitedly applied, but such embodiments may be configured by a selective combination of all or part of the embodiments so as to implement many variations.

Therefore, an aspect of the detailed description is to provide a head-up display (HUD) device having a backlight module which has a different structure from the related art.

Another aspect of the detailed description is to provide a vehicle which is capable of providing information more efficiently through a windshield while being driven.

Another aspect of the detailed description is to allow a call and other image information to be output on a separate display region in a reception state (or receiving state) and in an information displayable state, such that driving information cannot be interrupted due to other received information.

As embodied and broadly described herein, there is provided a head-up display (HUD) device configured to project an image on a windshield, the head-up display device including a display panel, a backlight module that is configured to emit light to the display panel, and an optical guide module that is configured to guide an image displayed on the display panel to the windshield. The backlight module may include a plurality of backlight units that are configured to emit light to the display panel in different directions from one another, such that independent images are projected on different regions of the windshield.

The backlight module may include first and second backlight units that are disposed in one direction with being spaced apart from each other. The backlight module may include a third backlight unit that is disposed in an intersecting direction with the one direction with being spaced apart from the first and second backlight units.

A lens array may be provided between the display panel and the backlight module, so as to gather light emitted from the backlight units to the display panel. The optical guide module may include a main mirror that is configured to reflect an image displayed on the display panel to the windshield, and sub mirrors that are inclinedly disposed with respect to a central axis of the display panel. The first backlight unit may be disposed to overlap a center of the display panel, and the sub mirrors may be disposed on an optical axis of light emitted from the second backlight unit.

The head-up display device may further include a controller that is configured to control the backlight unit, and a communication unit that is configured to perform data transmission and reception with an external device. The communication unit may receive data from a mobile terminal. The controller may control at least one backlight unit based on global positioning system (GPS) information, and controls the other backlight units based on the data received from the mobile terminal.

As embodied and broadly described herein, there is provided a vehicle including a windshield, and a head-up display (HUD) device that is configured to project an image on the windshield. The head-up display device may include a display panel, an optical guide module that is configured to guide an image displayed on the display panel to the windshield, and a backlight module that is configured to emit light to the display panel in different directions from one another, such that independent images are projected on different regions of the windshield.

The backlight module may include a plurality of backlight units that are disposed with being spaced apart from one another. The images may include a plurality of images that are projected on the different regions of the windshield by the plurality of backlight units, respectively.

Each of the plurality of images may be image information belonging to a different category. The image information belonging to the different category may be related to information received from a different source.

The vehicle may further include a communication unit that is configured to perform data transmission and reception with an external device. One of the plurality of images may be image information related to driving, and another one of the plurality of images may be image information related to data received from the external device. The vehicle may further include a handle having a manipulation unit, and the communication unit may transmit a signal input through the manipulation unit to the external device. The vehicle may further include a voice recognition unit that is configured to recognize a user's voice, and the communication unit may transmit a signal input through the voice recognition unit to the external device.

The vehicle may further include a controller that is configured to control a backlight unit, which outputs an image in a direction corresponding to a turn signal, among the plurality of backlight units, in response to a turn-on of the turn signal. The controller may control image information displayed on the display panel based on data sensed by a detection sensor when the turn signal is turned on, the detection sensor being provided at at least one side of the vehicle to detect an object surrounding the detection sensor.

The image information projected on the windshield may be changeable based on a manipulation of a vehicle gear.

The vehicle may further include a controller that is configured to control the display panel, and the controller may change the image information displayed on the display panel in response to an operation of each of the plurality of backlight units. The controller may reduce an operating time of each of the plurality of backlight units when the number of display regions displayed on the windshield increases.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A head-up display (HUD) device configured to project information as at least one of an image or text on a windshield, the head-up display device comprising:
    a display panel;
    a backlight module configured to emit light to the display panel, wherein the display panel modifies the light from the backlight module to form the information; and
    an optical guide module configured to guide the information from the display panel to the windshield,
    a communication module configured to receive data, and
    a controller configured to control the backlight module,
    wherein the backlight module includes a plurality of light sources configured to emit light to the display panel in different directions from one another such that parts of the information are independently projected on different regions of the windshield, the plurality of light sources being spaced apart from one another by a prescribed distance,
    wherein a plurality of cameras are provided to capture images of different portions of a vehicle that includes the head-up display device,
    wherein when a velocity of the vehicle is less than a predetermined velocity, the display panel generates a representation of the captured images of the different portions of the vehicle, and the controller is configured to control the plurality of light sources to emit light to the display panel such that the images of different portions of the vehicle are projected to the different regions of the windshield, and
    wherein when the velocity of the vehicle is faster than the predetermined velocity, the display panel is configured to switch from generating the representation of the captured images to generating a representation of the received data, and the controller is configured to:
        control a first light source of the plurality of light sources to emit light selectively to the display panel such that the representation of the received data generated by the display panel is projected to a first region of the windshield, and
        control a second light source of the plurality of light sources to emit light selectively to the display panel such that the projected representation of the received data is moved from the first region to a second region of the windshield.

2. The head-up display device of claim 1, wherein the optical guide module comprises:
    a main mirror configured to reflect the information emitted by the display panel to the windshield; and
    sub mirrors provided at inclined angles relative to a central axis of the display panel to direct projected information outputted by the display panel to the main mirror.

3. The head-up display device of claim 2, wherein the inclined angles of the sub mirrors are adjustable, and wherein a displayed location of the information on the windshield changes based on adjusting the inclined angles of the sub mirrors.

4. The head-up display device of claim 2, wherein a plurality of reflection mirrors are provided between the display panel and the main mirror to control light emitted from the display panel.

5. The head-up display device of claim 2, wherein a light source of the plurality of light sources is positioned to output light to a center of the display panel, and
    wherein the sub mirrors are provided on an optical axis of the light emitted from the light source.

6. The head-up display device of claim 1, further comprising:
    a lens array is provided between the display panel and the backlight module, wherein the lens array is configured to gather light emitted from the light sources and to direct the gathered light to the display panel.

7. The head-up display device of claim 1, wherein the communication module receives data from a mobile terminal, and
    wherein the controller controls at least one of the light sources based on global positioning system (GPS) information, and controls another at least one of the light sources based on the data received from the mobile terminal.

8. The head-up display device of claim 1, wherein the plurality of light sources are spaced apart from one another in one direction or in two or more intersecting directions.

9. The head-up display device of claim 1, wherein one of the light sources emits light to a portion of the display panel generating one category of information and another one of the light sources emits light to another portion of the display panel generating another category of information.

10. The head-up display device of claim 9,
    wherein the one category of information is related to an operation of the vehicle that includes the head-up display device, and
    wherein the other category of information is related to the data received by the communications module.

11. The head-up display device of claim 1, wherein the head-up display device is included in the vehicle that also includes a user input device, and wherein the communication module transmits input data received through the user input device to an external device.

12. The head-up display device of claim 1, wherein the head-up display device is included in the vehicle that also includes a voice recognition module configured to recognize a user's voice, and wherein the communication module transmits data received through the voice recognition module to an external device.

13. The head-up display device of claim 1, wherein the controller configured to control the light sources such that data identifying a direction of a turn signal is provided in a corresponding region of the different regions of the windshield.

14. The head-up display device of claim 1, wherein the information projected on the windshield changes based on manipulating of a gear shifting handle of a vehicle that includes the head-up display device.

15. The head-up display device of claim 1, wherein the head-up display device is included in the vehicle that also includes a sensor to detect an object or person located within a proximity of the vehicle, and wherein the projected information includes data sensed by the sensor.

16. The head-up display device of claim 1, wherein the controller further changes the information displayed on the display panel in response to selectively activating different ones of the plurality of light sources.

17. The head-up display device of claim 1, wherein the controller operates two of the light sources in an alternating manner such at least a portion of the information is alternately provided on different regions of the windshield.

18. The head-up display device of claim 17, wherein the controller selectively activates or deactivates a corresponding light source based on a change in the presented information.

19. The head-up display device of claim 17, wherein the controller controls at least two portions of the display panel when the information is alternately provided on the different regions of the windshield.

20. A vehicle including a head-up display device according to claim 1.

21. A mobile communication system including a head-up display device according to claim 1.

22. The head-up display device of claim 1, wherein:
the data received by the communication module includes driving path guide information related to a guide point,
the controller controls the first light source to emit light when the vehicle that includes the head-up display device moves within a first threshold distance of the guide point, and
the controller controls the second light source to emit light when the vehicle moves within a second threshold distance of the guide point, the second threshold distance being less than the first threshold distance.

23. The head-up display device of claim 1, wherein when the vehicle is travelling in a first direction, two or more of the plurality of captured images are presented in respective first positions on the windshield, and
wherein when the vehicle is travelling in a second direction that differs from the first direction, the two or more of the plurality of captured images are presented in respective second positions on the windshield.

* * * * *